(12) United States Patent
Ren

(10) Patent No.: US 12,484,980 B2
(45) Date of Patent: Dec. 2, 2025

(54) SLAVE-END APPARATUS FOR INTERVENTIONAL ROBOT

(71) Applicant: SHENZHEN INSTITUTE OF ADVANCED BIOMEDICAL ROBOT CO., LTD., Shenzhen (CN)

(72) Inventor: Wenyong Ren, Shenzhen (CN)

(73) Assignee: SHENZHEN INSTITUTE OF ADVANCED BIOMEDICAL ROBOT CO., LTD., Shenzhen (CN)

( * ) Notice: Subject to any disclaimer, the term of this patent is extended or adjusted under 35 U.S.C. 154(b) by 452 days.

(21) Appl. No.: 17/963,161

(22) Filed: Oct. 10, 2022

(65) Prior Publication Data

US 2023/0037841 A1    Feb. 9, 2023

Related U.S. Application Data

(63) Continuation of application No. PCT/CN2022/102910, filed on Jun. 30, 2022.

(30) Foreign Application Priority Data

Jul. 5, 2021   (CN) .......................... 202110758252.0
Jul. 5, 2021   (CN) .......................... 202110759058.4

(Continued)

(51) Int. Cl.
*A61B 34/37*        (2016.01)
*A61B 34/30*        (2016.01)

(52) U.S. Cl.
CPC .............. *A61B 34/37* (2016.02); *A61B 34/30* (2016.02); *A61B 2034/301* (2016.02); *A61B 2034/303* (2016.02)

(58) Field of Classification Search
CPC ... A61B 34/37; A61B 34/30; A61B 2034/301; A61B 2034/303; A61B 43/35;
(Continued)

(56) References Cited

U.S. PATENT DOCUMENTS

2014/0276391 A1   9/2014   Yu
2016/0051794 A1*  2/2016   Bian ................. A61M 25/0105
                                                          604/95.01
(Continued)

FOREIGN PATENT DOCUMENTS

CN    101999941 A    4/2011
CN    104287841 A    1/2015
(Continued)

OTHER PUBLICATIONS

International Search Report issued in corresponding International application No. PCT/CN2022/102910, mailed Aug. 25, 2022.
(Continued)

*Primary Examiner* — Carl H Layno
*Assistant Examiner* — Dhrasti Snehal Dalal

(57) ABSTRACT

A slave-end apparatus for an interventional robot includes: a body, and a first drive mechanism, a second drive mechanism and a third drive mechanism that are successively mounted on the body; wherein in a case that the guide wire runs into the second catheter, the second catheter runs into the first catheter, and the first catheter, the second catheter and the guide wire are respectively clamped by the first drive mechanism, the second drive mechanism and the third drive mechanism, the first drive mechanism, the second drive mechanism and the third drive mechanism move along the same axial direction on the body to respectively drive the first catheter, the second catheter and the guide wire to move.

19 Claims, 2 Drawing Sheets

(30) Foreign Application Priority Data

| | | | |
|---|---|---|---|
| Jul. 5, 2021 | (CN) | .......................... | 202110759063.5 |
| Aug. 31, 2021 | (CN) | .......................... | 202111009777.0 |
| Aug. 31, 2021 | (CN) | .......................... | 202111009785.5 |
| Aug. 31, 2021 | (CN) | .......................... | 202111009999.2 |

(58) Field of Classification Search
  CPC ....... A61B 1/00133; A61B 5/6852–09; A61M 25/01; A61M 25/09041; A61M 25/0105
  See application file for complete search history.

(56) References Cited

U.S. PATENT DOCUMENTS

| | | | |
|---|---|---|---|
| 2017/0348060 A1 | 12/2017 | Blacker | |
| 2018/0056044 A1* | 3/2018 | Choi | ...................... A61B 34/30 |
| 2018/0168751 A1 | 6/2018 | Yi et al. | |
| 2019/0038872 A1* | 2/2019 | Destrebecq | ........ A61M 25/0113 |
| 2020/0016371 A1* | 1/2020 | Blacker | .................. A61B 34/30 |
| 2021/0007816 A1 | 1/2021 | Huang | |

FOREIGN PATENT DOCUMENTS

| | | | | |
|---|---|---|---|---|
| CN | 105662588 A | 6/2016 | | |
| CN | 105664333 A | 6/2016 | | |
| CN | 105664333 A1 | 6/2016 | | |
| CN | 107307909 A * | 11/2017 | ............ A61M 25/01 | |
| CN | 107307909 A1 | 11/2017 | | |
| CN | 107374737 A | 11/2017 | | |
| CN | 107374737 A1 | 11/2017 | | |
| CN | 107374738 A | 11/2017 | | |
| CN | 107374738 A1 | 11/2017 | | |
| CN | 107374739 A | 11/2017 | | |
| CN | 107374741 A | 11/2017 | | |
| CN | 107374741 A1 | 11/2017 | | |
| CN | 109567947 A | 4/2019 | | |
| CN | 109567947 A1 | 4/2019 | | |
| CN | 109730779 A | 5/2019 | | |
| CN | 109821137 A | 5/2019 | | |
| CN | 109821137 A1 | 5/2019 | | |
| CN | 110327116 A | 10/2019 | | |
| CN | 111887979 A | 11/2020 | | |
| CN | 112041015 A | 12/2020 | | |
| CN | 112120745 A | 12/2020 | | |
| CN | 112155683 A | 1/2021 | | |
| CN | 212281559 U | 1/2021 | | |
| CN | 112546396 A | 3/2021 | | |
| CN | 112604131 A | 4/2021 | | |
| CN | 112674877 A * | 4/2021 | ............ A61M 25/09 | |
| CN | 112674877 A1 | 4/2021 | | |
| CN | 113729957 A | 12/2021 | | |
| CN | 113729958 A | 12/2021 | | |
| CN | 113729962 A | 12/2021 | | |
| FR | 3044541 A1 | 6/2017 | | |
| WO | 2020105228 A1 | 5/2020 | | |
| WO | 2021011533 A1 | 1/2021 | | |
| WO | 2021011534 A1 | 1/2021 | | |
| WO | 2021011554 A1 | 1/2021 | | |
| WO | 2022144266 A1 | 7/2022 | | |

OTHER PUBLICATIONS

Written Opinion of the International Search Authority in corresponding International application No. PCT/CN2022/102910.

* cited by examiner

SLAVE-END APPARATUS FOR INTERVENTIONAL ROBOT

CROSS REFERENCE TO RELATED APPLICATION

This application is a continuation application of International Application No. PCT/CN2022/102910, filed on Jun. 30, 2022, which claims priorities to: Chinese Patent Application No. 202110758252.0 field on Jul. 5, 2021, Chinese Patent Application No. 202110759063.5 field on Jul. 5, 2021, Chinese Patent Application No. 202110759058.4 field on Jul. 5, 2021, Chinese Patent Application No. 202111009785.5 field on Aug. 31, 2021, Chinese Patent Application No. 202111009777.0 field on Aug. 31, 2021, Chinese Patent Application No. 202111009999.2 field on Aug. 31, 2021, the disclosures of which are herein incorporated by reference in their entireties.

TECHNICAL FIELD

The present disclosure relates to the technical field of medical robots, applicable to master-slave vascular interventional robots, and in particular, relates to a slave-end apparatus for an interventional robot.

BACKGROUND

Minimally invasive vascular intervention refers to a physician, guided by a digital subtraction angiography (DSA) system, manipulating the movement of a catheter and a guide wire in human blood vessels to treat lesions, so as to achieve the purpose of embolization of abnormal vessels, thrombolysis, dilation of narrow vessels, and the like. At present, interventional therapy has played an important role in the diagnosis and treatment of hundreds of diseases, such as tumor, peripheral vessel disease, great vessel disease, digestive tract disease, nervous system disease, and non-vascular disease. The interventional therapy covers all diseases from the head to the foot of the human body, and has become the first choice for some diseases. Interventional therapy can treat many diseases that cannot be treated in the past or have a poor curative effect without incision of human tissues. In the interventional therapy, the incision (puncture point) only has the size of rice grains. The interventional therapy has the characteristics of no incision, small trauma, rapid recovery and good curative effect, which has been highly valued by domestic and foreign medical circles.

Currently, minimally invasive vascular intervention-assisting robots have developed rapidly due to the involvement of high-end medical equipment and robotic technology. We have also placed investment in research and development.

SUMMARY

A technical problem to be solved by the present disclosure is to provide a slave-end apparatus for an interventional robot which facilitates a physician in interventional procedures.

To solve the above technical problem, the present disclosure provides a slave-end apparatus for an interventional robot. The apparatus includes:

a body, and a first drive mechanism and a third drive mechanism mounted on the body; wherein the first drive mechanism is configured to clamp and rotate a first catheter, and the third drive mechanism is configured to clamp and rotate a guide wire;

wherein in a case that the guide wire runs into the first catheter and the first catheter and the guide wire are respectively clamped by the first drive mechanism and the third drive mechanism, the first drive mechanism and the third drive mechanism move along a same axial direction on the body to drive the first catheter and the guide wire to move.

Further, the apparatus further includes: a second drive mechanism; wherein the second drive mechanism is positioned between the first drive mechanism and the third drive mechanism; and the second drive mechanism is configured to clamp and rotate a second catheter;

wherein in a case that the guide wire runs into the second catheter, the second catheter runs into the first catheter, and the first catheter, the second catheter and the guide wire are respectively clamped by the first drive mechanism, the second drive mechanism and the third drive mechanism, the first drive mechanism, the second drive mechanism and the third drive mechanism move along the same axial direction on the body to respectively drive the first catheter, the second catheter and the guide wire to move.

Further, the apparatus further includes: a sixth drive mechanism mounted on the body; wherein the sixth drive mechanism is positioned between the second drive mechanism and the third drive mechanism; and the sixth drive mechanism is configured to clamp and rotate a third catheter;

wherein in a case that the guide wire runs into the third catheter, the third catheter runs into the second catheter, the second catheter runs into the first catheter, and the first catheter, the second catheter, the third catheter and the guide wire are respectively clamped by the first drive mechanism, the second drive mechanism, the sixth drive mechanism and the third drive mechanism, the first drive mechanism, the second drive mechanism, the sixth drive mechanism and the third drive mechanism move along the same axial direction on the body to respectively drive the first catheter, the second catheter, the third catheter and the guide wire to move.

Further, the apparatus further includes: a seventh drive mechanism mounted on the body; wherein the seventh drive mechanism is positioned between the second drive mechanism and the sixth drive mechanism; and the seventh drive mechanism and the sixth drive mechanism cooperate to drive the third catheter to move.

Further, in a case that the seventh drive mechanism moves to an extreme position and is to be restored to release the third catheter, the sixth drive mechanism is configured to clamp the third catheter to prevent movement thereof.

Further, the apparatus further includes: a fourth drive mechanism mounted on the body; wherein the fourth drive mechanism and the first drive mechanism cooperate to drive the first catheter to move.

Further, in a case that the fourth drive mechanism moves to an extreme position and is to be restored to release the first catheter, the first drive mechanism is configured to clamp the first catheter to prevent movement thereof.

Further, the fourth drive mechanism is positioned on a side, distal from the second drive mechanism, of the first drive mechanism.

Further, the apparatus further includes: a fifth drive mechanism mounted on the body; wherein the fifth drive mechanism and the second drive mechanism cooperate to drive the second catheter to move.

Further, in a case that the fifth drive mechanism moves to an extreme position and is to be restored to release the second catheter, the second drive mechanism is configured to clamp the second catheter to prevent movement thereof.

Further, the fifth drive mechanism is positioned between the first drive mechanism and the second drive mechanism.

Further, the apparatus further includes: a clamper; wherein in a case that the third drive mechanism moves to an extreme position and is to be restored to release the guide wire, the clamper is configured to clamp the guide wire to prevent movement thereof.

Further, the fourth drive mechanism and the fifth drive mechanism move along the same axial direction as the first drive mechanism, the second drive mechanism and the third drive mechanism.

Further, the first drive mechanism, the second drive mechanism, the third drive mechanism, the fourth drive mechanism and the fifth drive mechanism are all active drive mechanisms.

Further, the first drive mechanism, the second drive mechanism and the third drive mechanism are all active drive mechanisms, and the fourth drive mechanism and the fifth drive mechanism are both passive drive mechanisms.

Further, the first drive mechanism and the second drive mechanism each include: an identical clamping assembly; wherein the clamping assembly is configured to clamp an Y adapter connected to the catheter to clamp the catheter.

Further, the first drive mechanism and the second drive mechanism each include: an identical rotating assembly; wherein the rotating assembly is configured to rotate a Luer connector for the Y adapter to drive the catheter to rotate.

Further, the fourth drive mechanism and the fifth drive mechanism each include: an identical clamping assembly and an identical rotating assembly.

Further, the third drive mechanism includes: a clamping assembly and a rotating assembly; wherein the clamping assembly and the rotating assembly of the third drive mechanism are identical to or different from a clamping assembly and a rotating assembly of each of the fourth drive mechanism and the fifth drive mechanism.

Further, the apparatus further includes: an exchange mechanism; wherein the exchange mechanism is a rapid exchange mechanism or a coaxial exchange mechanism.

Further, the exchange mechanism is detachably fixed to the second drive mechanism, or the exchange mechanism and the second drive mechanism are integrally designed.

According to the present disclosure, the physician may remotely manipulate the first drive mechanism, the second drive mechanism and the third drive mechanism to move along the same axial direction on the body, to drive the catheter and the guide wire to collaboratively move to avoid radiation by X rays. In addition, the robot may more accurately control the catheter and the guide wire, which not only reduces working intensity, but also avoids severe mistakes.

DETAILED DESCRIPTION

Figure 1:
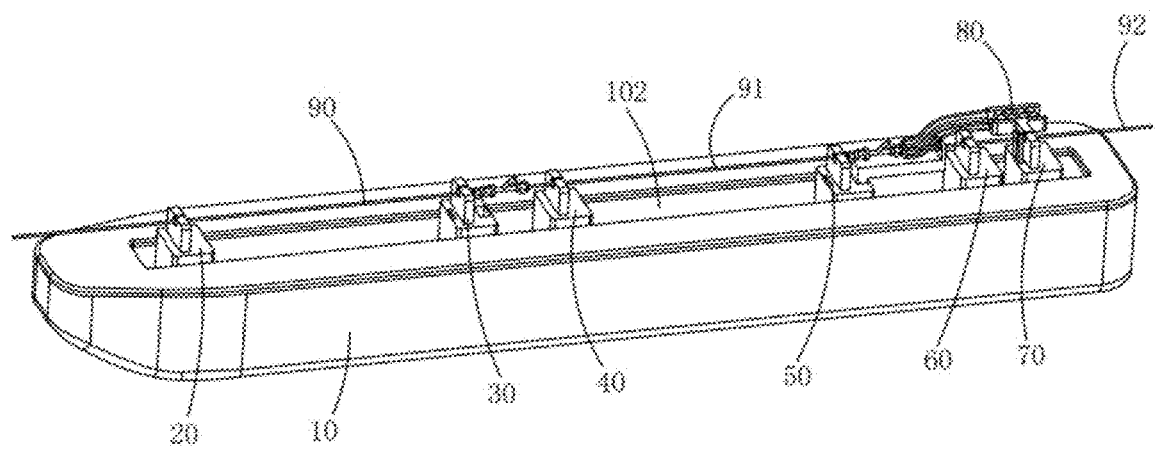
FIG. 1 is a schematic view of a slave-end apparatus for an interventional robot according to the present disclosure.

For clear description and better understanding of the technical problem to be solved, technical solutions, and advantages of the present disclosure, the present disclosure is further described in detail with reference to the accompanying drawings and specific embodiments. It should be understood that the embodiments described here are only exemplary ones for illustrating the present disclosure, and are not intended to limit the present disclosure.

In the description of the present disclosure, it should be noted that unless otherwise specified and defined, the terms "mounted," "coupled," "connected," "fixed," and derivative forms thereof shall be understood in a broad sense, which, for example, may be understood as fixed connection, detachable connection or integral connection or even connected in a relative movement fashion; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the present application according to the actual circumstances and contexts.

In the description of the present disclosure, the terms "length," "diameter," "upper," "lower," "front," "rear," "left," "right," "vertical," "horizontal," "top," "bottom," "inner," "outer," and the like indicate orientations or positional relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

The term "distal from" indicates a direction facing towards a patient, and the term "proximal to" indicates a direction facing away from the patient. The terms "up" and "upper" indicate a direction facing away from a direction of gravity, and the terms "bottom," "down," and "lower" indicate a direction facing towards the direction of gravity. The term "front" indicates a side where an interventional robot faces towards a user, and the term "forward" indicates a direction along which a guide wire or a catheter moves to the body of the patient. The term "rear" indicates a side where the interventional robot faces away from a user, and the term "backward" indicates a direction along which the guide wire or the catheter moves out of the body of the patient. The term "inwardly" indicates an inner portion of a feature. The term "outwardly" indicates an outer portion of a feature. The term "rotation" includes "forward rotation" and "reverse rotation," wherein the "forward rotation" indicates a direction along which the guide wire or the catheter rotates to move into the body of the patient, and the "reverse rotation" indicates a direction along which the guide wire or the catheter rotates to move out of the body of the patient.

In addition, terms of "first" and "second" are only used for description, but shall not be understood as indication or implication of relative importance or implicit indication of the number of the specific technical features. Therefore, the features defined by the terms "first" and "second" may explicitly or implicitly include one or more of these features. In addition, in the description of the present disclosure, the term "multiple," "more," or "a plurality of" refers to at least two unless otherwise specified.

It should be noted that, in the absence of conflict, embodiments of the present disclosure and features in the embodiments may be incorporated, which all fall within the protection scope of the present disclosure. In addition, all or part of the steps of the method may be performed in a computer system including a group of computer-executable instructions. Further, although the steps are listed in a sequence of 1, 2, 3 . . . , in some cases, the steps may also be performed in a sequence that is different form the sequence listed herein.

The guide wire herein includes, but is not limited to, a guide wire, a micro guide wire, a stent and the like guiding and supporting interventional medical instruments. The catheter includes, but is not limited to, a guide catheter, a micro catheter, an angiographic catheter, a multifunctional catheter (also referred to as a middle catheter), a thrombolytic catheter, a balloon dilatation catheter, a balloon-expandable stent catheter and the like interventional medical instruments for treatment.

Figure 2:
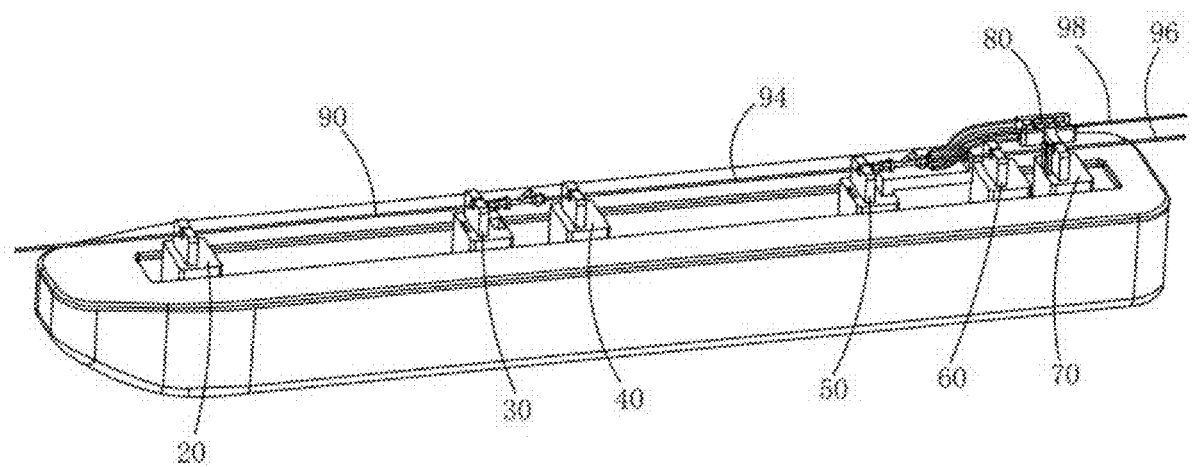
FIG. 2 is another schematic view of the slave-end apparatus in FIG. 1.

As illustrated in FIG. 1 and FIG. 2, an embodiment of the present disclosure provides a slave-end apparatus for an interventional robot. The apparatus includes: a body 10, drive mechanisms 20, 30, 40, 50 and 60, a clamper 70 and a rapid exchange mechanism 80 that are movably mounted on the body 10.

The body 10 is elongated, and is provided with a linear channel 102. The drive mechanisms 20, 30, 40, 50 and 60 are successively disposed on the channel 102, and are movable along the channel. In this embodiment, the drive mechanisms 20, 30, 40, 50 and 60 may directly slide on the body 10. For example, a linear guide rail is fixed on the body 10, and the drive mechanisms 20, 30, 40, 50 and 60 may all slide along the guide rail.

Each of the drive mechanisms is configured to clamp, push (including forward movement and backward movement) and rotate (including forward rotation and reverse rotation) the catheter and the guide wire, or may be configured to simultaneously clamp, push (including forward movement and backward movement) and rotate (including forward rotation and reverse rotation) both the catheter and the guide wire, such that a plurality of catheters and one guide wire collaboratively move. Each of the drive mechanisms includes: a clamping assembly configured to clamp the catheter or the guide wire, and a rotating assembly configured to rotate the catheter or the guide wire. The rotating assembly may be an active rotating assembly or a passive rotating assembly. The rotating assemblies may be all active rotating assemblies, or may be partially active rotating assemblies and partially passive rotating assemblies. Clamping of the catheters by the drive mechanisms 20 and 40 does not hinder rotation of the catheters.

The clamping assemblies and rotating assemblies of the drive mechanisms 20, 30, 40, 50 and 60 may be the slave-end guide wire and catheter twisting apparatus for the interventional robot as disclosed in Chinese Patent Application No. 202110674959.3, the disclosure of which is incorporated herein in its entirety.

In other embodiments, the specific structures of the drive mechanisms 20, 30, 40, 50 and 60 are not necessarily identical, but may be different from each other, as long as the catheter and the guide wire can be clamped, pushed and/or rotated. Optionally, the clamping assemblies may be identical, but the rotating assemblies may be different; or the clamping assemblies may be different, but the rotating assemblies may be identical; or some of the clamping assemblies and rotating assemblies may be identical, and the others of the clamping assemblies and rotating assemblies may be different.

In this embodiment, the drive mechanisms 20 and 30 are spaced apart from each other, and are configured to cooperate with each other to clamp, push and rotate a same guide catheter 90 (that is, a first catheter) to prevent the guide catheter 90 from being bent. In fact, it is preferable that the drive mechanisms 20 and 30 synchronously push the guide catheter 90, such that the guide catheter 90 is stretched straight, without being bent. Likewise, the drive mechanisms 40 and 50 are spaced apart from each other, and are configured to cooperate with each other to clamp, push and rotate a same multifunctional catheter 91 (that is, a second catheter, or also referred to as a middle catheter). The drive mechanism 60 is configured to clamp, push and rotate a guide wire 92. The clamper 70 is configured to clamp and push the guide wire 92. The rapid exchange mechanism 80 and the drive mechanism 50 may be detachably fixed to each other, and may be configured to clamp and push a rapid exchange catheter.

Before an operation, some preparations need to be made. Specifically, a guide catheter 90, a multifunctional catheter 91 and a guide wire 92 that are suitable (for example, those with suitable lengths and diameters) are selected, and the selected guide catheter 90 and multifunctional catheter 91 are washed with normal saline and exhausted. The multifunctional catheter 91 is led into the guide catheter 90 to go beyond the guide catheter 90 by a distance, the guide wire 92 is led into the multifunctional catheter 91 to go beyond the multifunctional catheter 91 by a distance, for example, the head of the guide wire 92 goes beyond the multifunctional catheter 91 by about 10 cm. The drive mechanisms 20, 30, 40, 50 and 60 are disposed at proper positions, the guide catheter 90, the multifunctional catheter 91 and the guide wire 92 are together placed and led into an introducer (for example, femoral artery, radial artery or the like) of a patient for operation, the clamping assemblies of the drive mechanisms 20 and 30 are caused to clamp the guide catheter 90, the clamping assemblies of the drive mechanisms 40 and 50 are caused to clamp the multifunctional catheter 91, and the clamping assembly of the drive mechanism 60 and a rear clamper 70 are caused to clamp the guide wire 92. In this way, the guide catheter 90, the multifunctional catheter 91 and the guide wire 92 are fixed.

When starting the operation, at the operation table, a master-end console (for example, the master-end operation handle for the interventional robot as disclosed in Chinese Patent Application No. 202110654379.8 and the master-end control module as disclosed in Chinese Patent Application No. 202110649908.5, the disclosures of which are incorporated herein in their entireties) is employed to remotely manipulate the drive mechanisms 20, 30, 40, 50 and 60, the clamper 70 and the rapid exchange mechanism 80 to move. The master-end console is spatially isolated from a catheter room, and the master-end console and the catheter room are deployed in different regions. Specifically, the drive mechanisms 20 and 30 collaboratively clamp the guide catheter 90 and move along a channel 102 to drive the guide catheter 90 to move forward, and the rotating assemblies of the drive mechanisms 20 and 30 simultaneously or non-simultaneously rotate the guide catheter 90. In a case that the drive mechanism 20 moves to an extreme position (for example, the drive mechanism 20 moves to a distal end of the channel 102) and is to be restored to release the guide catheter 90, the drive mechanism 30 clamps the guide catheter 90 to prevent movement thereof. In a case that the drive mechanism 20 is restored to a position proximal to the drive mechanism 30, the clamping assembly of the drive mechanism 20 clamps the guide catheter 90 again, and the drive mechanisms 20 and 30 are caused to collaboratively drive the guide catheter 90 to move forward, and the rotating assemblies of the drive mechanisms 20 and 30 simultaneously or non-simultaneously rotate the guide catheter 90. Such operations are repeated until the guide catheter 90 moves to a desired position.

In this process, the drive mechanisms 40 and 50 simultaneously or non-simultaneously collaboratively clamp the multifunctional catheter 91 and move along the channel 102 to drive the multifunctional catheter 91 to move forward, and the rotating assemblies of the drive mechanisms 40 and 50 simultaneously or non-simultaneously rotate the multifunctional catheter 91. In a case that the drive mechanism 40 moves to an extreme position (for example, a distance from the drive mechanism 40 to the drive mechanism 30 approaches a threshold) and is to be restored to release the multifunctional catheter 91, the drive mechanism 50 clamps the multifunctional catheter 91 to prevent movement thereof. In a case that the drive mechanism 40 is restored to a position proximal to the drive mechanism 50, the clamping assembly of the drive mechanism 40 clamps the multifunctional catheter 91 again, and the drive mechanisms 40 and 50 are caused to collaboratively drive the multifunctional catheter 91 to move forward, and the rotating assemblies of the drive mechanisms 40 and 50 simultaneously or non-simultaneously rotate the multifunctional catheter 91. Such operations are repeated until the multifunctional catheter 91 moves to a desired position.

In the above process, the drive mechanism 60 and the clamper 70 simultaneously or non-simultaneously collaboratively clamp the guide wire 92 and move along the channel 102 to drive the guide wire 92 to move forward, and the rotating assembly of the drive mechanism 60 simultaneously or non-simultaneously rotates the guide wire 92. In a case that the drive mechanism 60 moves to an extreme position (for example, a distance from the drive mechanism 60 to the drive mechanism 50 approaches a threshold) and is to be restored to release the guide wire 92, the clamper 70 clamps the guide wire 92 to prevent movement thereof. In a case that the drive mechanism 60 is restored, the clamping assembly of the drive mechanism 60 clamps the guide wire 92 again, and the drive mechanism 60 and the clamper 70 are caused to collaboratively drive the guide catheter 92 to move forward, and the rotating assembly of the drive mechanism 60 simultaneously or non-simultaneously rotates the guide wire 92. Such operations are repeated until the guide wire 92 moves to a desired position. In other embodiments, at the beginning, only the drive mechanism 60 clamps the guide wire 92, but the clamper 70 does not clamp the guide wire 92. In the case that the drive mechanism 60 is restored, the clamper 70 clamps the guide wire 92. In a case that the drive mechanism 60 is restored and clamps the guide wire 92 again, the clamper 70 releases the guide wire 92. Such operations are repeated such that the drive mechanism 60 and the clamper 70 alternately clamp the guide wire 92.

For details about how the master-end console remotely manipulates the drive mechanisms 20, 30, 40, 50 and 60, the clamper 70 and the rapid exchange mechanism 80 to move, reference may be made to the master-end control module for the interventional robot as disclosed in Chinese Patent Application 202110649908.5. The control module includes two operation levers, wherein one operation lever is configured to manipulate the drive mechanisms 20, 30, 40 and 50 and the rapid exchange mechanism 80, and this operation lever may manipulate the drive mechanism 20 and 30, the drive mechanisms 40 and 50 and the rapid exchange mechanism 80 in a time-division manner, and the other operation lever is configured to manipulate the drive mechanism 60 and the clamper 70. Optionally, the master-end console includes more than two operation levers, for example, four operation levers, which are respectively configured to remotely manipulate the drive mechanisms 20 and 30, the drive mechanisms 40 and 50, the drive mechanism 60 and the clamper 70, and the rapid exchange mechanism 80.

In other embodiments, the drive mechanisms 30 and 50 respectively clamp the guide catheter 90 and the multifunctional catheter 91 via an Y adapter. That is, the guide catheter 90 and the multifunctional catheter 91 are respectively connected to the Y adapter; the Y adapter is fixed to the drive mechanisms 30 and 50; and the clamping assemblies of the drive mechanisms 30 and 50 clamp the Y adapter, and the rotating assemblies of the drive mechanisms 30 and 50 rotate a Luer connector of the Y adapter to drive the guide catheter 90 and the multifunctional catheter 91 to rotate.

During collaborative pushing of the guide catheter 90, the multifunctional catheter 91 and the guide wire 92, it needs to be constantly ensured that the multifunctional catheter 91 goes beyond the guide catheter 90 by a distance and the guide wire 92 goes beyond the multifunctional catheter 91 by a distance. In a case that the guide catheter 90, the multifunctional catheter 91 and the guide wire 92 reach some positions of the vessel, the drive mechanisms 20, 30, 40, 50 and 60 and the clamper 70 need to be remotely manipulated by the master-end console, to drive the guide catheter 90, the multifunctional catheter 91 and the guide wire 92 to move forward and backward, and rotate forward and rotate reversely for multiple times.

In a case that the guide catheter 90 moves to a desired position, the guide catheter 90 is fixed, and the drive mechanisms 40, 50 and 60 and the clamper 70 are remotely manipulated by the master-end console, to drive the multifunctional catheter 91 and the guide wire 92 to move backward. The process of backward movement is similar to the above process of forward movement. In a case that the heads of the multifunctional catheter 91 and the guide wire 92 move backward to the introducer, in the catheter room, the multifunctional catheter 91 and the guide wire 92 are taken off from the clamping assemblies of the drive mechanisms 40, 50 and 60 and the clamper 70, and soaked into heparin water.

A micro catheter 94 and a micro guide wire 96 that are thinner (for example, with a diameter of 0.014 in) are selected. The micro guide wire 96 is led into the micro catheter 94, which are then led together into the guide catheter 90. The micro guide wire 96 goes beyond the micro catheter 94 by a distance, such that the micro catheter 94 and the micro guide wire 96 are respectively clamped by the clamping assemblies of the drive mechanisms 40 and 50, the clamping assembly of the drive mechanism 60, and the clamper 70. In this way, the micro catheter 94 and the micro guide wire 96 are fixed. In other embodiments, the micro catheter 94 is connected to an Y adapter. The Y adapter is fixed to the drive mechanism 50. The clamping assembly of the drive mechanism 50 clamps the Y adapter, and the rotating assembly of the drive mechanism 50 rotates a Luer connector of the Y adapter to drive the micro catheter 94 to rotate.

Further, by using the master-end console, the drive mechanisms 40, 50 and 60 and the clamper 70 are remotely manipulated to move. For details about the specific process, reference may be made to the forward movement of the multifunctional catheter 91 and the guide wire 92, which are thus not described herein any further. In a case that the micro catheter 94 and the micro guide wire 96 move forward to the head of the guide catheter 90, the micro catheter 94 and the micro guide wire 96 are further pushed to a lesion (that is, a target vessel stenosis site) of the patient for operation. The position of the micro guide wire 96 is determined by contrast radiography. In a case that the micro guide wire 96 reaches a designated position (generally, the micro guide wire 96 needs to run through the lesion of the patient for operation, except possible treatment of aneurysm embolization), the drive mechanisms 50 and 60 respectively fix the micro catheter 94 and the micro guide wire 96. In a case that the micro guide wire 96 fails to reach the designated position, the drive mechanisms 40, 50 and 60 and the clamper 70 are repeatedly remotely manipulated to move, until the micro guide wire 96 reaches the designated position.

In the case that the micro guide wire 96 reaches the designated position, the master-end console remotely manipulates the drive mechanisms 40 and 50 to cause the micro catheter 94 to move backward. In the meantime, the micro guide wire 96 is maintained as not moving. For example, as the drive mechanism 60 moves backward, the clamper 70 takes over to clamp the micro guide wire 96 to prevent movement thereof. In a case that the head of the micro catheter moves backward to the introducer, the micro catheter 94 is taken off from the drive mechanisms 40 and 50, and is soaked into the heparin water. In this case, the drive mechanism 60 may take over to clamp the micro guide wire 96, and maintain the drive mechanisms 20 and 30 and the drive mechanism 60 as respectively fixing the guide catheter 90 and the micro guide wire 96.

In the catheter room again, the tail of the micro guide wire 96 is caused to run into a rapid exchange balloon dilatation catheter 98. The rapid exchange balloon dilatation catheter 98 moves forward along with the micro guide wire 96. In this case, the rapid exchange mechanism 80 clamps the rapid exchange balloon dilatation catheter 98.

Further, by using the master-end console, the rapid exchange mechanism 80 is remotely manipulated, such that the rapid exchange balloon dilatation catheter 98 moves forward to the lesion of the patient for operation (not going beyond the head of the micro guide wire 96). In this process, the position and angle of the micro guide wire 96 need to be finely adjusted by forward rotation, reverse rotation, forward movement, and backward movement according to actual needs. In a case that the rapid exchange balloon dilatation catheter 98 reaches the lesion of the patient for operation, a contrast medium is filled into the rapid exchange balloon dilatation catheter 98 in the catheter room for pre-dilatation, and a vasodilation effect is determined by contrast radiography. In a case that the vasodilation effect is achieved, the contrast medium is extracted from the rapid exchange balloon dilatation catheter 98. Further, by using the master-end console, the rapid exchange mechanism 80 is remotely manipulated to move backward to the introducer. In the process that the rapid exchange balloon dilatation catheter 98 moves backwards, the position of the micro guide wire 96 remains unchanged. With respect to some operations, vasodilation needs to be performed for multiple times. Therefore, the rapid exchange balloon dilatation catheter 98 may move forward and move backward for multiple times.

Further, in the catheter room again, the rapid exchange balloon dilatation catheter 98 is taken off from the rapid exchange mechanism 80, and then a balloon-expandable stent catheter is caused to run into the micro guide wire 96 and to be clamped on the rapid exchange mechanism 80. For details about the specific process, reference may be made to the above process of the rapid exchange balloon dilatation catheter 98, which are thus not described herein any further.

Further, by using the master-end console, the rapid exchange mechanism 80 is remotely manipulated, such that the rapid exchange balloon dilatation catheter is pushed along the micro guide wire 96 to the lesion of the patient for operation (a vessel site that has been expanded). In this process, the position and angle of the micro guide wire 96 need to be finely adjusted by forward rotation, reverse rotation, forward movement, and backward movement according to actual needs. When the rapid exchange balloon-expandable stent catheter reaches the lesion of the patient for operation (the vessel side that has been expanded), the position of the rapid exchange balloon-expandable stent catheter is fine-tuned, after determination, the rapid exchange balloon-expandable stent catheter is filled with the contrast medium in the catheter room, such that the stent is shaped. It is confirmed by contrast radiography that the placement of the balloon-expandable stent is correct, i.e., the contrast medium may be extracted and the rapid exchange mechanism 80 is manipulated to drive the rapid exchange balloon-expandable stent catheter to move backward to the introducer, whereas the balloon-expandable stent remains in the lesion of the patient for operation. In the catheter room, the rapid exchange balloon-expandable stent catheter is taken off from the rapid exchange mechanism 80, and is put into the heparin water.

Further, by using the master-end console, the drive mechanisms 20, 30, 40, 50 and 60 and the clamper 70 are remotely manipulated to move, such that the guide catheter 90 and the micro guide wire 96 move backward to the introducer. Finally, in the catheter room, the guide catheter 90 and the micro guide wire 96 are taken off from the clamping assemblies of the drive mechanisms 20, 30 and 60 and the clamper 70, the guide catheter 90 and the micro guide wire 96 are withdrawn from the introducer and soaked into the heparin water, and then the introducer is removed and post-operation treatment is carried out to complete the operation.

In the above process, the rapid exchange catheter is used, and therefore, the catheter needs to be clamped, pushed and rotated by a rapid exchange mechanism 80. In a case that a coaxial exchange catheter is used, where the tail of the micro guide wire 96 is caused to run into the coaxial exchange catheter, the coaxial exchange catheter is clamped, pushed and rotated by the coaxial exchange mechanism, such that the coaxial exchange catheter moves forward to an appropriate position along the micro guide wire 96 or moves backward to the introducer. Regardless of the rapid exchange mechanism 80 or the coaxial exchange mechanism, the clamping, pushing and rotating of the rapid exchange catheter and the coaxial exchange catheter may be practiced by means of roller driving.

Figure 3:
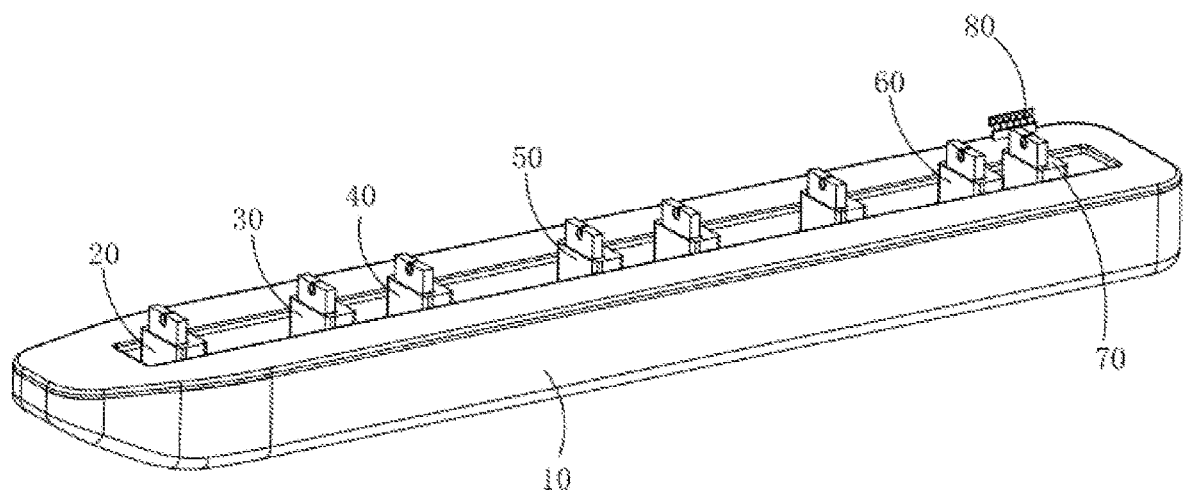
FIG. 3 is a schematic view of the slave-end apparatus in FIG. 1 in which two drive mechanisms are added.
Figure 4:
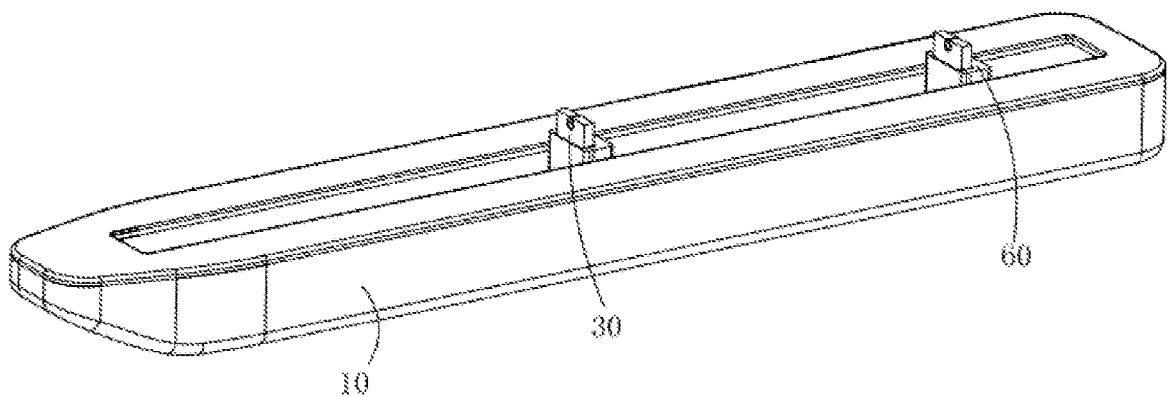
FIG. 4 is a schematic view of the slave-end apparatus in FIG. 1 in which only two drive mechanisms are remained.

In the above, the movement and control process of the present disclosure has been described by taking "balloon-expandable stent angioplasty" as an example. Indeed, the present disclosure may also be used in a variety of procedures including contrast radiography, embolization, thrombectomy, and the like. The drive mechanisms 20, 30, 40, 50 and 60, the clamper 70 and the rapid exchange mechanism 80 may be freely adapted according to the actual needs of the operation, i.e., the drive mechanisms 20, 30, 40, 50 and 60, the clamper 70 and the rapid exchange mechanism 80 may all be easily disassembled and assembled. Where more complicated operations are performed, more drive mechanisms, clampers and rapid exchange mechanisms may be deployed. In a case that more drive mechanisms and clampers are deployed, the collaborative movement of a plurality of catheters corresponding to one guide wire or corresponding to a plurality of guide wires may be practiced. As illustrated in FIG. 3, two drive mechanisms are added to clamp and rotate more catheters. For details, reference may be made to the above-mentioned "balloon stent angioplasty." A rapid exchange mechanism is provided for each drive mechanism that constantly clamps the catheter, and is either removably mounted to the drive mechanism or integrally formed with the drive mechanism. In case of performing simple examination procedures, such as an angiographic procedure, only two of the drive mechanisms 20, 30, 40, 50 and 60, such as the drive mechanisms 30 and 60, are used. Referring to FIG. 4, the other drive mechanisms, the clamper 70 and the rapid exchange mechanism 80 are removed from the body 10. Hereinafter, description of the collaborative movement and control of one catheter and one guide wire in the case of the drive mechanisms 30 and 60 according to the present disclosure is given using an angiographic procedure as an example.

In the preparations for the operation, a guide catheter, a guide wire and an angiographic catheter with appropriate diameters and lengths are selected according to the position of a vascular lesion, and the guide catheter and angiographic catheter are washed with normal saline and exhausted. An interventional robot is started to complete initialization. An introducer is placed for a patient for operation. The guide wire is led into the guide catheter to move out of the guide catheter by a distance, for example, the head of the guide wire exceeds the guide catheter by about 10 cm, and then the guide wire and the guide catheter are together placed into the introducer. The clamping assemblies of the drive mechanisms 30 and 60 are caused to respectively clamp the guide catheter and the guide wire, such that the guide catheter and guide wire are fixed.

When starting the operation, by using the master-end console, the drive mechanisms 30 and 60 are remotely manipulated to move. The guide catheter and the guide wire are respectively caused to move forward collaboratively to the target vessel. For details about the process, reference may be made to the above-mentioned "balloon stent angioplasty." The heads of the guide catheter and the guide wire are maintained within an image field of view. At this time, the drive mechanism 30 is caused to clamp the guide catheter to prevent movement thereof, and the drive mechanism 60 is remotely manipulated to move backward, such that the guide wire is withdrawn to the introducer.

In the catheter room, the guide wire is taken off from the clamping assembly of the drive mechanism 60, and soaked into the heparin water. The contrast medium is filled into the guide catheter, contrast radiography is carried out, and complete image information at different angles at the target vessel is acquired.

Where image information of a plurality of target vessels needs to be acquired, another guide wire is inserted into the guide catheter and is caused to forward to the introducer, and the guide wire is clamped on the clamping assembly of the drive mechanism 60. At this time, by using the master-end console, the drive mechanisms 30 and 60 are remotely manipulated to move, the guide catheter and the guide wire are respectively moved forward to another target vessel collaboratively, the guide wire is moved backward to the introducer and the guide wire is taken off, then the contrast medium is filled again into the guide catheter, contrast radiography is carried out, and finally complete image information at different angles at another target vessel is acquired. This is done multiple times until complete image information is obtained for all target vessels.

Further, the drive mechanism 30 is remotely manipulated to move backward to drive the guide catheter to be withdrawn to the introducer. In the catheter room, the guide catheter and the previously used guide wire are taken off from the clamping assemblies of the drive mechanisms 30 and 60 respectively, and withdrawn from the introducer.

For prevention of bending of the guide catheter and the guide wire in forward movement, the drive mechanism 20 may be used in collaboration with the drive mechanism 30 to push and rotate the guide catheter, and the holder 70 may be used in collaboration with the drive mechanism 60 to push and rotate the guide wire.

In the above description, the master-end console and the operable table on which the master-end console is deployed are outside the catheter room. In fact, the master-end console and the operable table may also be deployed in a separate space in the catheter room, as long as X-ray radiation can be isolated and the physician is exempt from the X-ray radiation.

The above only describes how the catheter and the guide wire are replaced in some cases. In fact, the replacement of the catheter and the guide wire may be completely determined according to the actual needs of the operation and the personal operating habits. The placement is not limited to the above methods for replacing the catheter and the guide wire.

Accordingly, the present disclosure enables a physician to remotely manipulate a drive mechanism, a clamper and a rapid exchange mechanism so as to drive a catheter and a guide wire in a collaborative fashion, which not only prevents the health effects caused by X-ray radiation, but also enables a robot to control the movement of the catheter and the guide wire more precisely, which reduces the working intensity and further avoids severe mistakes.

Persons of ordinary skill in the art should understand that all or part of steps of the method may be implemented by programs instructing related hardware. The programs may be stored in a computer-readable storage medium, for example, a read-only memory, a magnetic disk, or a compact disc read-only memory. Alternatively, all or part of the steps of the embodiments described above may be implemented using one or more integrated circuits. Accordingly, various modules/units in the above-mentioned embodiments may be implemented in the form of hardware or in the form of software functional modules. The present disclosure is not limited to any specific form of hardware or software combination.

Nevertheless, many other embodiments may also be available for implementation of the present disclosure, and those skilled in the art would recognize that various modifications and changes may be made thereto without departing from the spirit and scope of the present disclosure. These modifications and changes fall within the protection scope set forth in the appended claims.

Described are merely preferred embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A slave-end apparatus for an interventional robot, comprising: a body, and a first drive mechanism and a third drive mechanism mounted on the body;

wherein the first drive mechanism is configured to clamp and rotate a first catheter, and the third drive mechanism is configured to clamp and rotate a guide wire, the first drive mechanism and the third drive mechanisms each comprise a clamping assembly configured to clamp the catheter or the guide wire, and a rotating assembly configured to rotate the catheter or the guide wire;

wherein in a case that the guide wire runs into the first catheter and the first catheter and the guide wire are respectively clamped by the first drive mechanism and the third drive mechanism, the first drive mechanism and the third drive mechanism move along a same axial direction on the body to drive the first catheter and the guide wire to move;

wherein the slave-end apparatus for an interventional robot further comprises a clamper, the third driving mechanism and the clamper cooperate to drive the guide wire to rotate, wherein the clamper and the third drive mechanism respectively clamp two ends of the guide wire for synchronous processing.

2. The slave-end apparatus for the interventional robot according to claim 1, further comprising: a second drive mechanism mounted on the body; wherein the second drive mechanism is positioned between the first drive mechanism and the third drive mechanism; and the second drive mechanism is configured to clamp and rotate a second catheter, and the second drive mechanism comprises a clamping assembly configured to clamp the catheter or the guide wire, and a rotating assembly configured to rotate the catheter or the guide wire;

wherein in a case that the guide wire runs into the second catheter, the second catheter runs into the first catheter, and the first catheter, the second catheter and the guide wire are respectively clamped by the first drive mechanism, the second drive mechanism and the third drive mechanism, the first drive mechanism, the second drive mechanism and the third drive mechanism move along the same axial direction on the body to respectively drive the first catheter, the second catheter and the guide wire to move.

3. The slave-end apparatus for the interventional robot according to claim 2, further comprising: a sixth drive mechanism mounted on the body; wherein the sixth drive mechanism is positioned between the second drive mechanism and the third drive mechanism; and the sixth drive mechanism is configured to clamp and rotate a third catheter, and the sixth drive mechanism comprises a clamping assembly configured to clamp the catheter or the guide wire, and a rotating assembly configured to rotate the catheter or the guide wire;

wherein in a case that the guide wire runs into the third catheter, the third catheter runs into the second catheter, the second catheter runs into the first catheter, and the first catheter, the second catheter, the third catheter and the guide wire are respectively clamped by the first drive mechanism, the second drive mechanism, the sixth drive mechanism and the third drive mechanism, the first drive mechanism, the second drive mechanism, the sixth drive mechanism and the third drive mechanism move along the same axial direction on the body to respectively 15 drive the first catheter, the second catheter, the third catheter and the guide wire to move.

4. The slave-end apparatus for the interventional robot according to claim 3, further comprising: a seventh drive mechanism mounted on the body; wherein the seventh drive mechanism is positioned between the second drive mechanism and the sixth drive mechanism; and the seventh drive mechanism and the sixth drive mechanism cooperate to drive the third catheter to move, and the seventh drive mechanism comprises a clamping assembly configured to clamp the catheter or the guide wire, and a rotating assembly configured to rotate the catheter or the guide wire.

5. The slave-end apparatus for the interventional robot according to claim 4, wherein in a case that the seventh drive mechanism moves to an extreme position and is to be restored to release the third catheter, the sixth drive mechanism is configured to clamp the third catheter to prevent movement thereof.

6. The slave-end apparatus for the interventional robot according to claim 2, further comprising: a fourth drive mechanism mounted on the body; wherein the fourth drive mechanism and the first drive mechanism cooperate to drive the first catheter to move, and the fourth drive mechanism comprises a clamping assembly configured to clamp the catheter or the guide wire, and a rotating assembly configured to rotate the catheter or the guide wire.

7. The slave-end apparatus for the interventional robot according to claim 6, wherein in a case that the fourth drive mechanism moves to an extreme position and is to be restored to release the first catheter, the first drive mechanism is configured to clamp the first catheter to prevent movement thereof.

8. The slave-end apparatus for the interventional robot according to claim 6, wherein the fourth drive mechanism is positioned on a side, distal from the second drive mechanism, of the first drive mechanism.

9. The slave-end apparatus for the interventional robot according to claim 6, further comprising: a fifth drive mechanism mounted on the body; wherein the fifth drive mechanism and the second drive mechanism cooperate to drive the second catheter to move, and the fifth drive mechanism comprises a clamping assembly configured to clamp the catheter or the guide wire, and a rotating assembly configured to rotate the catheter or the guide wire.

10. The slave-end apparatus for the interventional robot according to claim 9, wherein in a case that the fifth drive mechanism moves to an extreme position and is to be restored to release the second catheter, the second drive mechanism is configured to clamp the second catheter to prevent movement thereof.

11. The slave-end apparatus for the interventional robot according to claim 9, wherein the fifth drive mechanism is positioned between the first drive mechanism and the second drive mechanism.

12. The slave-end apparatus for the interventional robot according to claim 9, wherein the fourth drive mechanism and the fifth drive mechanism move along the same axial direction as the first drive mechanism, the second drive mechanism and the third drive mechanism.

13. The slave-end apparatus for the interventional robot according to claim 9, wherein the first drive mechanism, the second drive mechanism, the third drive mechanism, the fourth drive mechanism and the fifth drive mechanism are all active drive mechanisms.

14. The slave-end apparatus for the interventional robot according to claim 9, wherein the first drive mechanism, the second drive mechanism and the third drive mechanism are all active drive mechanisms, and the fourth drive mechanism and the fifth drive mechanism are both passive drive mechanisms.

15. The slave-end apparatus for the interventional robot according to claim 2, further comprising: an exchange mechanism; wherein the exchange mechanism is a rapid exchange mechanism or a coaxial exchange mechanism; and the exchange mechanism is detachably fixed to the second drive mechanism, or the exchange mechanism and the second drive mechanism are integrally designed.

16. The slave-end apparatus for the interventional robot according to claim 1, wherein in a case that the third drive mechanism moves to an extreme position and is to be restored to release the guide wire, the clamper is configured to clamp the guide wire to prevent movement thereof.

17. The slave-end apparatus for the interventional robot according to claim 1, wherein the third drive mechanism collaborates with the clamper to propel the guide wire, when the third drive mechanism reaches its limit position and prepares to reset, thereby releasing the guide wire, the clamper secures the guide wire in a stationary position, following the reset of the third drive mechanism, the third drive mechanism and the clamper collaboratively resumes control of the guide wire to continue its movement.

18. The slave-end apparatus for the interventional robot according to claim 1, wherein the clamper and the third drive mechanism respectively clamp two ends of the guide wire for synchronous clamping and synchronous rotation.

19. The slave-end apparatus for the interventional robot according to claim 1, wherein the clamper is positioned on a rear side of the third drive mechanism and has an adjustable installation position.

\* \* \* \* \*